(12) United States Patent
Kiran et al.

(10) Patent No.: US 10,496,838 B1
(45) Date of Patent: Dec. 3, 2019

(54) SECURITY PROTECTION FOR VIRTUAL MACHINE BACKUPS

(71) Applicant: EMC IP Holding Company LLC, Hopkinton, MA (US)

(72) Inventors: Mv Kiran, Bangalore (IN); Manjunath Jagannatha, Bangalore (IN); Ravi Shankar Panem, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 124 days.

(21) Appl. No.: 15/727,260

(22) Filed: Oct. 6, 2017

(51) Int. Cl.
*G06F 21/62* (2013.01)
*G06F 21/60* (2013.01)
*G06F 21/57* (2013.01)
*H04L 29/06* (2006.01)
*G06F 11/14* (2006.01)

(52) U.S. Cl.
CPC .......... *G06F 21/6209* (2013.01); *G06F 21/57* (2013.01); *G06F 21/602* (2013.01); *G06F 11/1458* (2013.01); *H04L 63/0428* (2013.01)

(58) Field of Classification Search
CPC .... G06F 21/6209; G06F 21/57; G06F 21/602; G06F 11/1458; H04L 63/0428
See application file for complete search history.

(56) References Cited

U.S. PATENT DOCUMENTS

| | | | |
|---|---|---|---|
| 9,372,760 B1* | 6/2016 | Tsaur | H04L 69/40 |
| 9,449,191 B2* | 9/2016 | MacCarthy | H04L 9/008 |
| 2015/0331758 A1* | 11/2015 | Durge | H04L 29/08 |
| | | | 707/640 |
| 2017/0005787 A1* | 1/2017 | Weaver | G16H 50/30 |

* cited by examiner

*Primary Examiner* — Lynn D Feild
*Assistant Examiner* — Jessica J South
(74) *Attorney, Agent, or Firm* — Womble Bond Dickinson (US) LLP

(57) ABSTRACT

One embodiment is related to a method for encrypting a block based backup image file, comprising: preparing an unencrypted block based backup image file; determining whether a region of the unencrypted block based backup image file to be streamed to a backup medium corresponds to a block allocation table (BAT) region; streaming regions of the unencrypted block based backup image file determined as not corresponding to the BAT region unchanged to the backup medium; and encrypting regions of the unencrypted block based backup image file determined as corresponding to the BAT region before streaming the regions determined as corresponding to the BAT region to the backup medium.

18 Claims, 4 Drawing Sheets

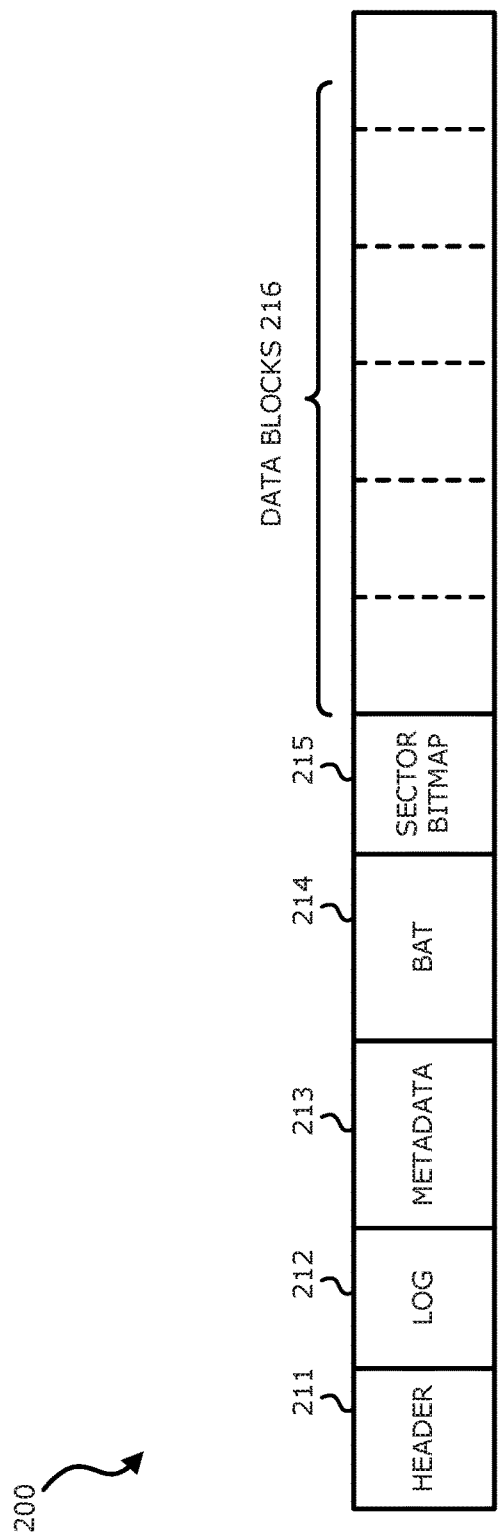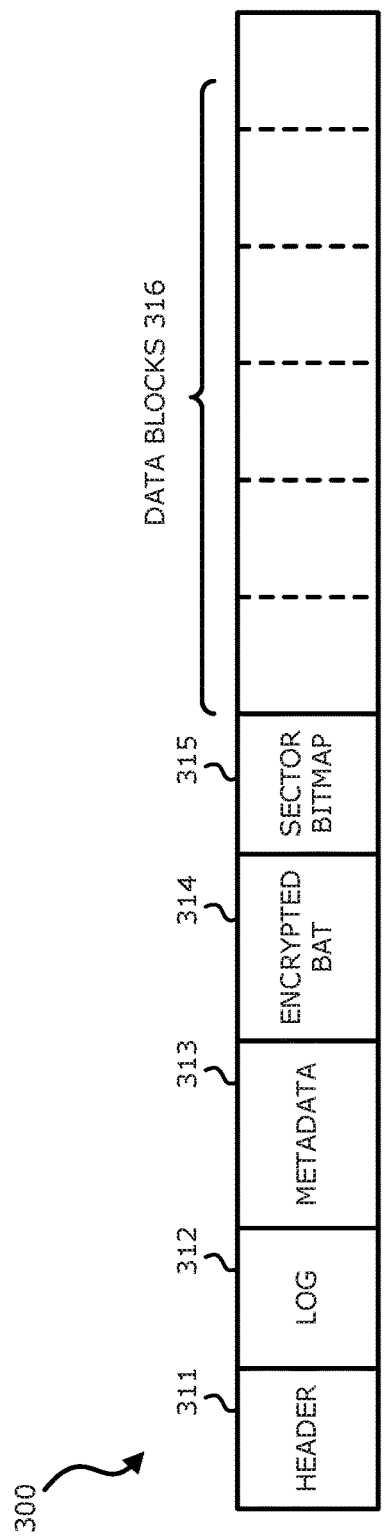

SECURITY PROTECTION FOR VIRTUAL MACHINE BACKUPS

FIELD OF THE INVENTION

Embodiments of the disclosure are related to electronic devices, and more particularly, to a method, apparatus, and system for backing up and encrypting a virtual disk file.

BACKGROUND

Data backup and data security are of great importance in our digital society. Without data backup, important user data such as documents, spreadsheets, photos, and videos on the storage device could disappear. Without data security, a user's sensitive data could fall into wrong hands, resulting in identity theft and other serious consequences. In short, sensitive information needs to be backed up, and in a secure fashion. One way to secure the access to a data backup is to encrypt it.

Block based backup solutions are popular these days. Formats for block based backup solutions are mountable. Examples for such mountable formats include Virtual Hard Disk (VHD), Hyper-V Virtual Hard Disk (VHDx), and Virtual Machine Disk (VMDK), etc. If an unauthorized user can gain access to one of these files on the backup media, s/he would be able to perform native mount operations to steal the backed up data. With just a mount operation, the user's backed up data, in its entirety, will be visible to the hacker or intruder. So encryption is very much desired for these mountable backup format solutions.

Conventional backup technologies secure the access to a block based backup file by encrypting the entire backup image. This is time consuming and therefore lengthens the backup time.

BRIEF DESCRIPTION OF THE DRAWINGS

Embodiments of the invention are illustrated by way of example and not limitation in the figures of the accompanying drawings in which like references indicate similar elements.

FIG. 2 is a block diagram illustrating the structure of a VHDX file

FIG. 3 is a block diagram illustrating an example encrypted VHDX file, according to one embodiment of the invention.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Embodiments of the invention are related to a method for encrypting a block based backup image file, comprising: preparing an unencrypted block based backup image file; determining whether a region of the unencrypted block based backup image file to be streamed to a backup medium corresponds to a block allocation table (BAT) region; streaming regions of the unencrypted block based backup image file determined as not corresponding to the BAT region unchanged to the backup medium; and encrypting regions of the unencrypted block based backup image file determined as corresponding to the BAT region before streaming the regions determined as corresponding to the BAT region to the backup medium.

Figure 1:
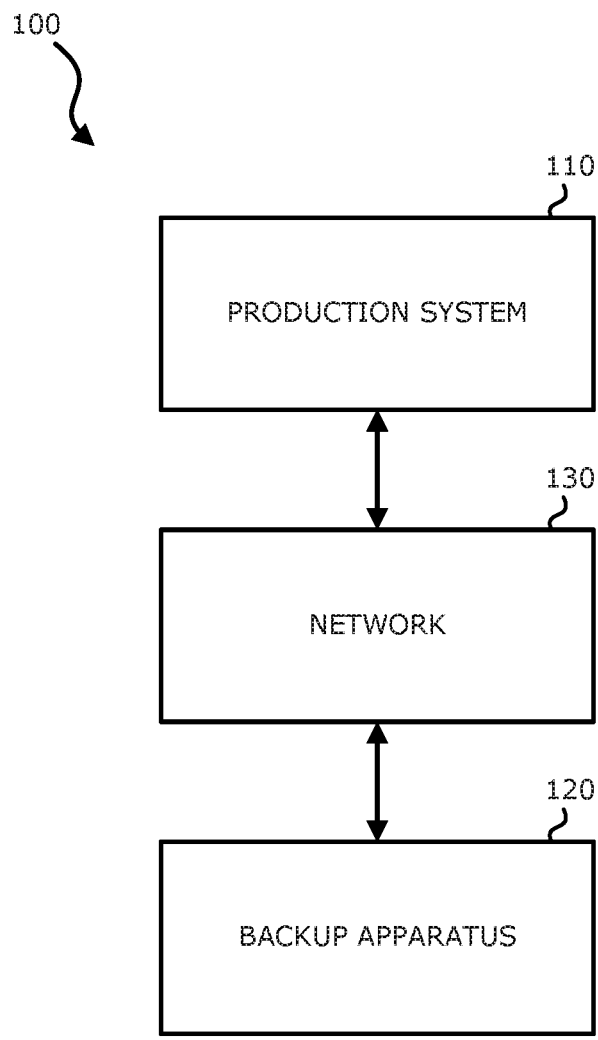
FIG. 1 is a block diagram illustrating an example environment in which embodiments of the invention may be practiced.

Referring to FIG. 1, a block diagram illustrating an example environment 100 in which embodiments of the invention may be practiced is shown. The environment 100 may comprise a production system 110 and a backup apparatus 120 (e.g., a backup system such as a Dell EMC Data Domain system), both of which are connected to a network 130 and can communicate through the network 130. In one embodiment, the production system 110 may host one or more virtualized environments that host production applications (e.g., web applications, etc.).

Common virtual environments (e.g., Microsoft Hyper-V or VMWare ESXi) may use block based backup file formats such as VHD/VHDX or VMDK to represent virtual disks. The backbone of protecting these virtualized environments is the backing up of the virtual disk files.

Outside the context of virtual environments, the block based solutions may also be used to backup data. Block based backup greatly improves backup time over a file level backup. Details regarding the block based backup technique can be found in Balasubramanian et al., U.S. Pat. No. 8,738,870, issued May 27, 2014, incorporated herein by reference, and Balasubramanian et al., U.S. Pat. No. 8,898,407, issued Nov. 25, 2014, incorporated herein by reference.

Referring to FIG. 2, a block diagram illustrating the structure of a VHDX file 200 is shown. The VHDX file 200 contains a header section 211, a log 212, a metadata section 213, a block allocation table (BAT) 214, a sector bitmap 215, and data blocks 216.

In a VHDX file, the BAT is used to specify the physical file offset for each block. Detailed explanation of the VHDX file format can be found in the document Microsoft Corp.: VHDX Format Specification Version 1.00, published Aug. 25, 2012, incorporated herein by reference. The equivalent of the BAT in the VMDK format is called a Grain Table. Hereinafter the term BAT may be used to refer to any structured data with a similar function in a virtual disk format.

A block based backup image file (e.g., a VHD/VHDX file, a VMDK file, etc.) can be mounted by an operating system, which exposes the file system of the backup image. One example method for mounting a block based backup image is described in Nam, U.S. Pat. No. 9,280,423, issued Mar. 8, 2016, incorporated herein by reference.

Therefore, the BAT is of critical importance in parsing a block based backup image file: without it, the backup image file cannot be properly read.

One embodiment of the invention relates to encrypting a block based backup image file by encrypting only the BAT region of the file.

Referring to FIG. 3, a block diagram illustrating an example encrypted VHDX file 300, according to one embodiment of the invention, is shown. The VHDX file 300 is the result of encrypting the VHDX file 200 according to one embodiment of the invention. The header section 311, the log 312, the metadata section 313, the sector bitmap 315, and data blocks 316, of the VHDX file 300 are the same as the header section 211, the log 212, the metadata section 213, the sector bitmap 215, and data blocks 216, of VHDX file 200, respectively. The encrypted BAT 314 of the VHDX file 300 has been generated by encrypting the BAT 214 of the VHDX file 200. Therefore, the contents of the encrypted VHDX file 300 cannot be accessed as is because the BAT 314 is encrypted. To access the contents of the encrypted VHDX file 300, the encrypted BAT 314 needs to be decrypted first.

Figure 4:
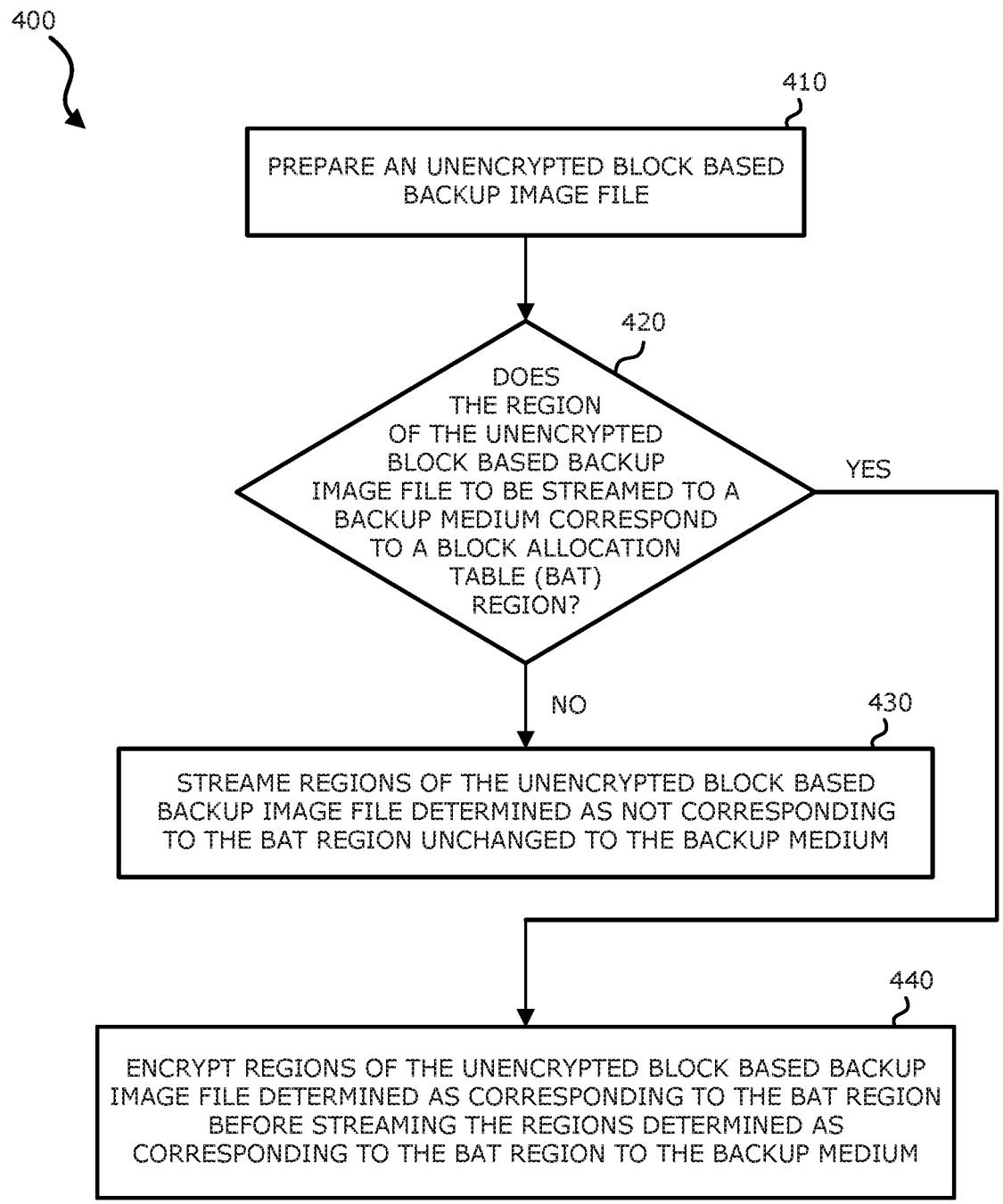
FIG. 4 is a flowchart illustrating an example method for encrypting a block based backup image file, according to one embodiment of the invention.

Referring further to FIG. 4, a flowchart illustrating an example method 400 for encrypting a block based backup image file, according to one embodiment of the invention, is shown. At block 410, an unencrypted block based backup image file may be prepared. At block 420, whether a region of the unencrypted block based backup image file to be streamed to a backup medium corresponds to a BAT region may be determined. At block 430, regions of the unencrypted block based backup image file determined as not corresponding to the BAT region may be streamed unchanged to the backup medium. At block 440, regions of the unencrypted block based backup image file determined as corresponding to the BAT region may be encrypted before being streamed to the backup medium. Any suitable encryption scheme (e.g., a symmetric key scheme such as Twofish, Serpent, AES, Blowfish, etc.) may be used. Embodiments of the invention are not limited by the encryption scheme used. The backup image file stored at the backup medium after the regions of the unencrypted block based backup image file determined as corresponding to the BAT region are encrypted is not mountable as is.

It should be appreciated that embodiments of the invention may be utilized with any suitable block based image file format. The formats include, but are not limited to, VHD/VHDX, VMDK, qcow (QEMU Copy On Write), VDI (VirtualBox Disk Image), etc. All of the above-mentioned image file formats contain a BAT or a region equivalent to the BAT.

Method 400 may be performed by processing logic that includes hardware (e.g. circuitry, dedicated logic, etc.), software (e.g., embodied on a non-transitory computer readable medium), or a combination thereof. For example, method 400 may be performed by processors 1501 of FIG. 5. Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Therefore, embodiments of the invention are related to efficiently encrypting a block based backup image file by encrypting only the BAT. Compared to encrypting the whole file, encrypting only the BAT greatly improves the encryption and decryption speed as the amount of data that needs to be encrypted or decrypted is greatly reduced. Accordingly, the backup time can be significantly improved without unacceptable compromises on security. Further, with the correct encryption key, the encrypted backup image file can be transformed back into the decrypted, mountable form very quickly. Embodiments of the invention can be utilized with any backup storage system (e.g., Dell EMC Data Domain systems, Advanced File Type Devices "AFTD," cloud-based backup, etc.).

Figure 5:
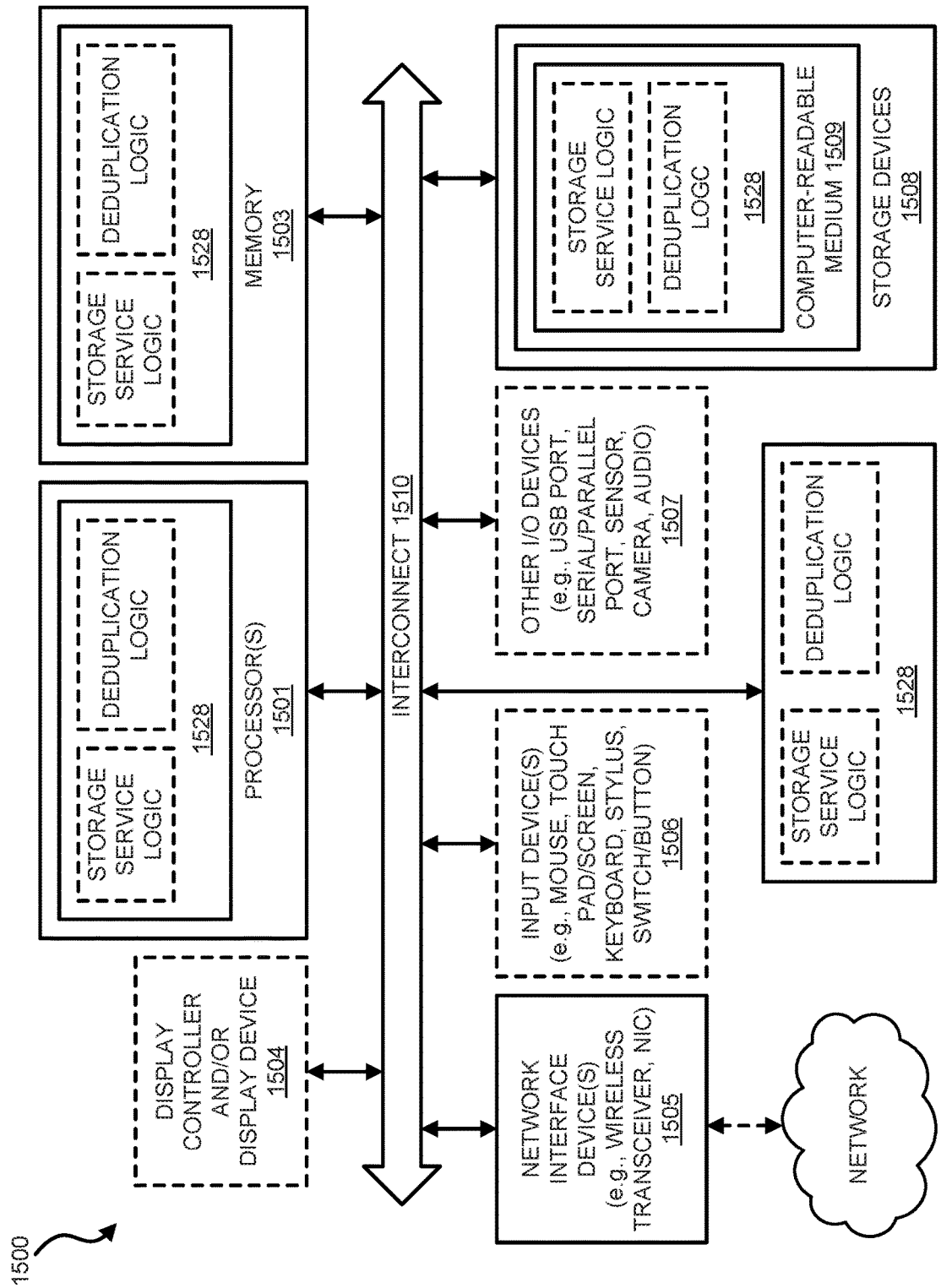
FIG. 5 is a block diagram illustrating an example of a data processing system which may be used with one embodiment of the disclosure.

FIG. 5 is a block diagram illustrating an example of a data processing system 1500 which may be used with one embodiment of the disclosure. For example, system 1500 may represent any of data processing systems described above performing any of the processes or methods described above. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Module/unit/logic 1528 may also reside, completely or at least partially, within memory 1503 and/or within processor 1501 during execution thereof by data processing system 1500, memory 1503 and processor 1501 also constituting machine-accessible storage media. Module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Module/unit/logic 1528, components and other features described herein can be implemented as discrete hardware components or integrated in the functionality of hardware components such as ASICS, FPGAs, DSPs or similar devices. In addition, module/unit/logic 1528 can be implemented as firmware or functional circuitry within hardware devices. Further, module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method for encrypting a block based backup image file, comprising:
    preparing an unencrypted block based backup image file;
    determining whether a region of the unencrypted block based backup image file to be streamed to a backup medium corresponds to a block allocation table (BAT) region of the backup image file;
    streaming regions of the unencrypted block based backup image file determined as not corresponding to the BAT region unchanged to the backup medium; and
    encrypting regions of the unencrypted block based backup image file determined as corresponding to the BAT region of the backup image file before streaming the regions determined as corresponding to the BAT region to the backup medium.

2. The method of claim 1, wherein the block based backup image file is a Hyper-V Virtual Hard Disk (VHDX) file or a Virtual Hard Disk (VHD) file.

3. The method of claim 1, wherein the block based backup image file is a Virtual Machine Disk (VMDK) file, and the BAT region is a Grain Table.

4. The method of claim 1, wherein the regions of the unencrypted block based backup image file determined as corresponding to the BAT region are encrypted with a symmetric key scheme.

5. The method of claim 1, wherein the unencrypted block based backup image file is mountable.

6. The method of claim 1, wherein a backup image file stored at the backup medium after the regions of the unencrypted block based backup image file determined as corresponding to the BAT region are encrypted is not mountable.

7. A non-transitory machine-readable medium having instructions stored therein which, when executed by a processor, cause the processor to perform operations for backing up a block based backup image file, the operations comprising:
    preparing an unencrypted block based backup image file;
    determining whether a region of the unencrypted block based backup image file to be streamed to a backup medium corresponds to a block allocation table (BAT) region of the backup image file;
    streaming regions of the unencrypted block based backup image file determined as not corresponding to the BAT region unchanged to the backup medium; and
    encrypting regions of the unencrypted block based backup image file determined as corresponding to the BAT region of the backup image file before streaming the regions determined as corresponding to the BAT region to the backup medium.

8. The non-transitory machine-readable medium of claim 7, wherein the block based backup image file is a Hyper-V Virtual Hard Disk (VHDX) file or a Virtual Hard Disk (VHD) file.

9. The non-transitory machine-readable medium of claim 7, wherein the block based backup image file is a Virtual Machine Disk (VMDK) file, and the BAT region is a Grain Table.

10. The non-transitory machine-readable medium of claim 7, wherein the regions of the unencrypted block based backup image file determined as corresponding to the BAT region are encrypted with a symmetric key scheme.

11. The non-transitory machine-readable medium of claim 7, wherein the unencrypted block based backup image file is mountable.

12. The non-transitory machine-readable medium of claim 7, wherein a backup image file stored at the backup medium after the regions of the unencrypted block based backup image file determined as corresponding to the BAT region are encrypted is not mountable.

13. A data processing system, comprising:
    a processor; and
    a memory coupled to the processor storing instructions which, when executed by the processor, cause the processor to perform backup operations, the operations including:
        preparing an unencrypted block based backup image file;

determining whether a region of the unencrypted block based backup image file to be streamed to a backup medium corresponds to a block allocation table (BAT) region of the backup image file;

streaming regions of the unencrypted block based backup image file determined as not corresponding to the BAT region unchanged to the backup medium; and encrypting regions of the unencrypted block based backup image file determined as corresponding to the BAT region of the backup image file before streaming the regions determined as corresponding to the BAT region to the backup medium.

14. The data processing system of claim 13, wherein the block based backup image file is a Hyper-V Virtual Hard Disk (VHDX) file or a Virtual Hard Disk (VHD) file.

15. The data processing system of claim 13, wherein the block based backup image file is a Virtual Machine Disk (VMDK) file, and the BAT region is a Grain Table.

16. The data processing system of claim 13, wherein the regions of the unencrypted block based backup image file determined as corresponding to the BAT region are encrypted with a symmetric key scheme.

17. The data processing system of claim 13, wherein the unencrypted block based backup image file is mountable.

18. The data processing system of claim 13, wherein a backup image file stored at the backup medium after the regions of the unencrypted block based backup image file determined as corresponding to the BAT region are encrypted is not mountable.

* * * * *